United States Patent Office 3,729,405
Patented Apr. 24, 1973

3,729,405
PHOTOCYCLOADDITION POLYMERISATION
OF BIS-COUMARINS
Frans Carolus De Schrijver, Leuven, and Luc Leenders, Hasselt, Belgium, assignors to AGFA-Gevaert N.V., Mortsel, Belgium
No Drawing. Filed June 29, 1972, Ser. No. 267,482
Claims priority, application Great Britain, July 12, 1971, 32,613/71
Int. Cl. C08d 1/00; C08f 1/16
U.S. Cl. 204—159.23                10 Claims

ABSTRACT OF THE DISCLOSURE

Photocycloaddition polymerization products are obtained by irradiation with ultraviolet light, having a wavelength above 310 nm., and in the presence of a photosensitizer, of bis-coumarines of the formula:

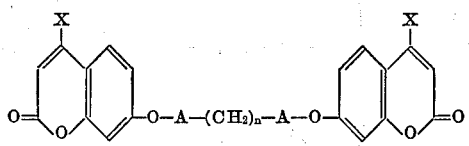

wherein:

A represents a carbonyl group or a chemical bond,
X represents an alkyl group (1–4 C), and
n is an integer from 1 to 20.

Upon exposure of the photocycloaddition polymerization products with ultraviolet light of 310 nm. the monomeric bis-coumarines are reformed.

---

The invention relates to a process for the photocycloaddition polymerization of bis-coumarins.

In the French patent specification 1,593,304 bis-coumarin compounds are described, which correspond to the general formula:

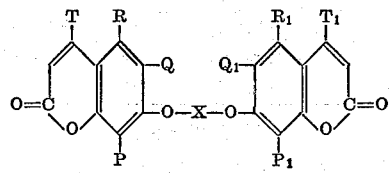

wherein Q, R, $Q_1$, and $R_1$, same or different, represent hydrogen atoms, alkyl groups, alkoxy groups, hydroxyl groups, or halogen atoms, P and $P_1$ represent hydrogen atoms or acyl groups;
T and $T_1$, same or different, represent alkyl groups or aryl groups, and
X represents a hydrocarbon group, wherein some of the carbon atoms of the chain may be substituted by carbocyclic or heterocyclic groups, by carbonyl groups, or by oxygen atoms.

It has been found now that some of these bis-coumarins form polymers by a photo-cycloaddition reaction, and that these polymers have very special and useful properties.

According to the invention a process is provided for the photocycloaddition polymerization of bis-coumarins, which process comprises exposing to ultraviolet radiation having a wavelength above 310 nm., in the presence of a photo-sensitizer, bis-coumarins corresponding to the general formula:

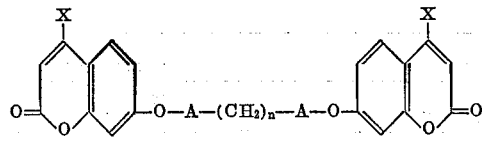

wherein:

A represents a carbonyl group or a chemical bond,
X represents an alkyl group of 1 to 4 carbon atoms, and
n is an integer from 1 to 20.

Most conveniently the irradiation of the bis-coumarins with ultraviolet radiation having a wavelength above 310 nm. occurs in solution in halogenated alkanes such as dichloromethane, the photosensitizer also being dissolved therein. Although the presence of oxygen does not inhibit the photo-cycloaddition polymerization reaction, it acts in some way as a reaction retarder so that it is removed preferably from the solution by bubbling an inert gas, such as dry oxygen-free argon, therethrough. The bis-coumarins may also be irradiated in the solid state, preferably in the form of a thin coating applied from solution to any support, such as paper.

Irradiation of the bis-coumarin solution preferably occurs in physically and chemically inert glass tubes.

As photosensitizers compounds are used, which possess a triplet energy of or above 68 kcal. $mole^{-1}$. Such compounds are acetophenone, propiophenone, isobutyrophenone, xanthone, triphenylamine, dibenzothiophene, 1,3,5-triacetylbenzene, carbazole and especially benzophenone.

During irradiation with ultraviolet radiation having a wavelength above 310 nm., the absorption characteristics in the IR and NMR spectra of the —CH=CH— bond of the coumarin unit disappeared, only to be replaced by peaks that are attributed to cyclobutane rings. During irradiation it is preferable to exclude radiation with wavelengths below about 310 nm., which radiation might bring about a reverse reaction causing a reopening of the cyclobutane rings formed. This can be remedied by placing between the radiation source and the bis-coumarin solution an aqueous filter solution containing per litre 600 g. of sodium bromide/2 water and 3 g. of lead acetate.

The temperature of the reaction varies between 30 and 35° C. After irradiation the solution is yellow. In some cases, especially when high concentrations of photosensitizer are used, a thin film of polymer is formed on the wall of the polymerization tube.

After polymerization the solutions of polymers containing cyclobutane rings are evaporated and washed with large quantities of ether to eliminate all traces of photosensitizer and residual monomer. The polymers are soluble in haloalkanes such as dichloromethane and chloroform.

It has been observed that the photo-cycloaddition polymerization reaction is reversible. Indeed, when the polymers are exposed to radiation of 310 nm. or less, they are degraded, which results in the formation of coumarin end groups. The degraded polymers can be re-polymerized by exposing them again to ultraviolet radiation at about 365 nm. in the absence of oxygen.

By NMR spectroscopy and by dipole moment measurements it could be proved that the polymerization products possess an exo-cyclobutane configuration. By irradiation at 310 nm. this configuration is destroyed and the original bis-coumarins are restored.

Most of the polymers are soluble in haloalkanes such as dichloromethane and chloroform. In some cases they become insoluble in these solvents as a result of crystallization. In these cases the polymers were found to be soluble in dimethylsulphoxide, thus proving that no cross-linked structures were formed.

The photo-cycloaddition polymers can be formed from solutions into transparent films, which are more brittle when the number of —$CH_2$— groups forming the alkylene group between two coumarin groups is small.

Exposure of the films to ultraviolet radiation of 310 nm. results in a rupture of the coumarin bridges between the monomer units. So, two free coumarin end groups are formed, which cause emission of light when properly excited. This emission is bathochromic with respect to the exciting radiation.

The polymer chains can be reformed upon exposure to ultraviolet radiation of 365 nm. or higher intensities, in the absence of oxygen.

The occurrence of light emission can be used on a very interesting photographic procedure. Indeed, when the photo-cycloaddition polymers of the bis-coumarins are applied as a layer to a support, this layer can be image-wise exposed to radiation of short wavelengths, e.g., by means of a UV laser emitting at 310 nm., so that the bonds between two coumarin groups are destroyed at the exposed places. The image thus formed in the layer can be scanned with an ultraviolet laser and recorded with a photocell sensitive to the light-emitted at those places where the polymer has been destroyed by the U.V. irradiation at 310 nm.

The photocycloaddition polymers obtained when exposing the bis-coumarins described above to ultraviolet radiation having a wavelength above 310 nm., correspond to the general formula:

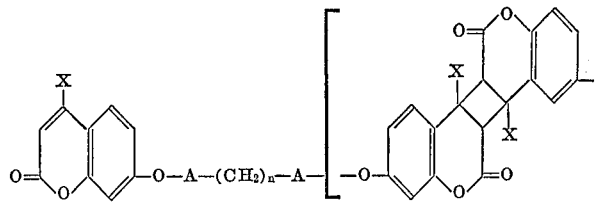

wherein A, X, and $n$ have the same significance as indicated above and $m$ is a measure for the polymerization degree reached.

The preparation of 7,7'-polymethylene dioxycoumarins and of the diesters of polymethylene dicarboxylic acids with 7-hydroxycoumarins, is described hereinafter.

PREPARATION 1

7,7'-polymethylene dioxycoumarins 0.12 mole of 7-hydroxycoumain, 0.24 mole of dry potassium carbonate and 0.06 mole of ω,ω'-dibromoalkane in 700 ml. of acetone that has been dried on potassium carbonate are introduced in a reaction flask. The flask is equipped with a reflux condenser provided with a calcium chloride tube and the suspension is refluxed for 10–15 hours.

Thereafter the solvent is evaporated under reduced pressure and the residue is poured in a large quantity of water that has been made slightly alkaline. The precipitate formed is sucked off and washed five times with pure water. The almost white reaction product is air-dried whereafter it is again dissolved in acetone and precipitated in diethyl ether or in a mixture of diethyl ether and petroleum ether. This procedure is repeated until a thin-layer chromatogram of the precipitate proves that only one single pure product is present.

The 7,7'-polymethylene dioxy-coumarins correspond to the formula:

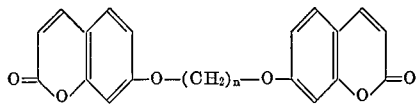

The results of a few reactions is given in the following table.

PREPARATION 2

Diester of polymethylene dicarboxylic acid and 7-hydroxy coumarin 300 ml. of anhydrous benzene, 0.08 mole of 7-hydroxycoumarin and 0.08 mole of anhydrous pyridine are poured in a flask provided with a reflux condenser. At a temperature of 60–70° C. and while continuously stirring, 0.04 mole of polymethylene dicarboxylic acid chloride dissolved in 100 ml. of anhydrous benzene are added dropwise. Stirring is continued for about 6–7 hours at the same temperature.

The precipitate that may have formed is filtered and the solvent is evaporated under reduced pressure. The precipitate is dissolved in acetone and whilst stirring precipitated in an excess of water and the precipitate is purified by crystallization.

The diester formed corresponds to the formula:

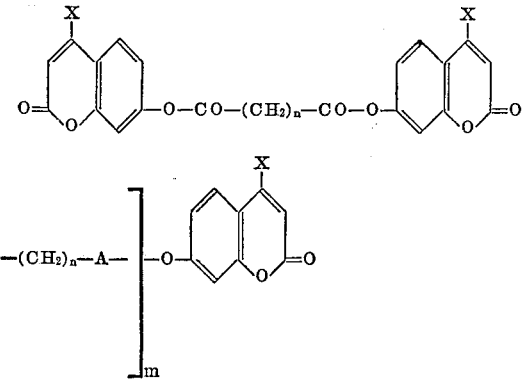

The results of a few reactions are given in the following table:

| $n$ | X | Polymethylene dicarboxylic aicd chloride | Melting point (° C.) | Crystallization solvent |
|---|---|---|---|---|
| 5 | H | ClOC(CH₂)₅COCl | 138–139 | Ethanol/chloroform. |
| 6 | H | ClOC(CH₂)₆COCl | | |
| 7 | H | ClOC(CH₂)₇COCl | 123–124 | Ethanol. |
| 7 | CH₃ | ClOC(CH₂)₇COCl | 135–136.5 | Do. |
| 8 | H | ClOC(CH₂)₇COCl | 163–164 | Ethanol/chloroform. |
| 8 | CH₃ | ClOC(CH₂)₈COCl | 162–163 | Do. |

EXAMPLES 1–5

The 7,7'-polymethylene dioxycoumarins (obtained according to the method described in Preparation 1) and benzophenone are dissolved in a given concentration in dichloromethane. Dry argon gas is bubbled through the solutions for about 1 hour to eliminate all oxygen. The solutions are poured in chemically and physically inert glass tubes and exposed in a Rayonet RS photochemical reactor of Southern New England Ultraviolet Company, Middletown, Conn., U.S.A. equipped with a RUL 3500 A. radiation source.

To exclude all radiation of wavelengths below about 310 nm. a filter solution can be placed between the dioxy-coumarin solution and the radiation source, e.g. by introducing the glass tubes containing the dioxycoumarins in a larger glass tube containing an aqueous solution of 600 g. of sodium bromide and 3 g. of lead acetate per litre of water. Care should be taken that the filter layer has a thickness of approximately 1 cm. thick.

After exposure the solution has turned yellow. In some cases, especially when high concentrations of benzophenone are used, a polymer film forms on the glass wall.

| $n$ | Dibromo-alkane used | Refluxing time (hr.) | Melting point (° C.) | Precipitant | Crystallization solvent |
|---|---|---|---|---|---|
| 10 | Br(CH₂)₁₀Br | 13 | 135.136 | Diethyl ether | Benzene. |
| 11 | Br(CH₂)₁₁Br | 16 | 117–117.25 | Diethyl ether/petroleum ether (2:3 vol.) | Benzene/n-hexane (3:2 vol.) |

The solvent is evaporated at room temperature under reduced pressure. The residue is washed twice with 30 ml. of diethyl ether. The residue is then dissolved in dichloromethane and precipitated in n-hexane. This process is repeated two times and with a thin-layer chromatogram the product is examined to be sure that all benzophenone has been eliminated. The intrinsic viscosity and the molecular weight are determined after careful drying in vacuo.

The results of the photocycloaddition reactions are given in the following table.

| Ex. | $n$ | Concentration of dioxycoumarin (mol $l^{-1}$) | Concentration of benzophenone (mol $l^{-1}$) | Exposure (hours) | Intrinsic viscosity $[\eta]$ | Mol. wt. | Number of repeating units |
|---|---|---|---|---|---|---|---|
| 1 | 10 | $5.10^{-2}$ | 1.75 | 67.5 | | 5,900 | 11.7 |
| 2 | 10 | $5.10^{-2}$ | 2.988 | 64.75 | 0.28 | | |
| 3 | 10 | $5.10^{-2}$ | 0.322 | 64.75 | 0.24 | | |
| 4 | 10 | $5.10^{-2}$ | 0.030 | 64.75 | 0.14 | | |
| 5 | 11 | $5.10^{-2}$ | 0.322 | 51 | 0.38 | 7,900 | 16.5 |

The intrinsic viscosity was determined in chloroform, whereas the molecular weight was determined with a Mechrolab-vapour pressure osmometer.

EXAMPLES 6–11

The diesters obtained according to the method described in Preparation 2 are dissolved, together with benzophenone in dichloromethane and exposed at 30–35° C. in a Rayonet RS Photochemical Reactor with a RUL 3500 A. radiation lamp, after elimination of most of the oxygen by placing the solutions three or four times under high vacuum.

The light yellow solutions are poured whilst vigorously stirring in an excess of n-hexane. The precipitated polymers are filtered and dried under vacuum. The intrinsic viscosity of the polymers is measured in chloroform and their molecular weight is determined by means of a Mechrolab 301A vapour pressure-osmometer.

The results of these processes are given in the following table.

| Ex. | $n$ | X | Concentration of diester (mol $l^{-1}$) | Concentration of benzophenone (mol $l^{-1}$) | Exposure time (hours) | $[\eta]$ | Molecular weight |
|---|---|---|---|---|---|---|---|
| 6 | 7 | H | $1.10^{-1}$ | $0.15.10^{-1}$ | 96 | 0.12 | 2,420 |
| 7 | 7 | CH$_3$ | $0.96.10^{-1}$ | $0.6.10^{-1}$ | 67 | 0.33 | 7,700 |
| 8 | 8 | H | $0.55.10^{-1}$ | $0.8.10^{-2}$ | 36 | 0.18 | |
| 9 | 8 | H | $0.67.10^{-1}$ | $0.61.10^{-1}$ | 48 | | |
| 10 | 8 | H | $0.62.10^{-1}$ | $0.32.10^{-1}$ | 53 | 0.12 | |
| 11 | 8 | CH$_3$ | $0.95.10^{-1}$ | $0.60.10^{-1}$ | 63 | 0.42 | 10,000 |

EXAMPLE 12

The photo-cycloadition polymer of Example 11 having an intrinsic viscosity of 0.42 is exposed to radiation of 310 nm. A degradation of the polymer takes place so that after 12 hours of irradiation a polymer is obtained, the intrinsic viscosity of which has been reduced to 0.1.

The light emission occurring in those places where the polymer has been destroyed by the ultraviolet radiation at 310 nm. is recorded with a photocell that is sensitive to this light emission. If the layer of photocycloaddition polymer is irradiated image-wise at 310 nm., degradation occurs also image-wise and an image corresponding to the original image-wise exposure can be read with the scanning photo-cell.

We claim:

1. Process for the photocycloaddition polymerization of bis-coumarins, which comprises exposing to ultraviolet radiation having a wavelength above 310 nm., in the presence of a photosensitizer which possesses a triplet energy of or above 68 kcal. mole$^{-1}$, bis-coumarins of the general formula:

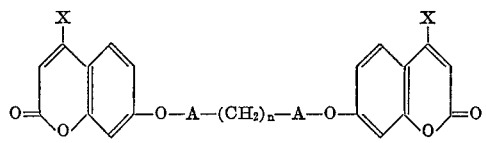

wherein:

A represents a carbonyl group or a chemical bond,
X represents an alkyl group of 1 to 4 carbon atoms, and
$n$ is an integer from 1 to 20.

2. Process according to claim 1, wherein the photosensitizer is benzophenone.

3. Photocycloaddition polymerization products of bis-coumarins corresponding to the general formula:

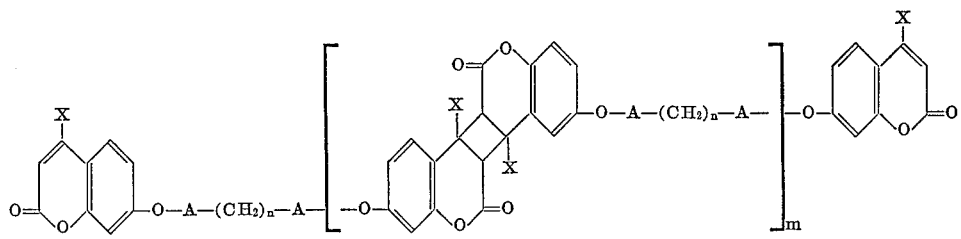

wherein:

A represents a carbonyl group or a chemical bond,
X represents an alkyl group of 1 to 4 carbon atoms,
$n$ is an integer from 1 to 20, and
$m$ is a measure for the polymerization degree reached.

4. The process according to claim 1 wherein the exposure is at a temperature of from about 30 to 35° C.

5. The process according to claim 1 wherein the bis-coumarins has the formula:

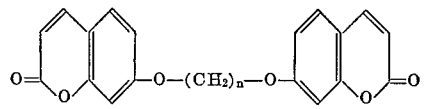

6. The process according to claim 1 wherein the bis-coumarins has the formula:

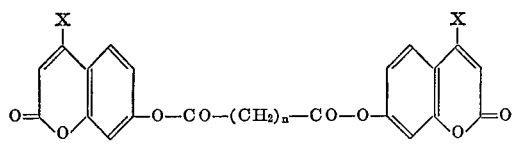

7. The photocycloaddition polymerization product of claim 3 wherein X is hydrogen.

8. The photocycloaddition polymerization product of claim 3 wherein X is $CH_3$.

9. The photocycloaddition polymerization product of claim 3 wherein A is a single bond.

10. The photocycloaddition polymerization product of claim 3 wherein A is C=O.

References Cited

UNITED STATES PATENTS 3,445,545  5/1969  Skooltchi _____ 260—47 UA

FOREIGN PATENTS 1,593,304  7/1970  France.

OTHER REFERENCES

Hoffman et al.: "Organic Photochemistry XII—Further Studies on the Mechanism of Coumarin Photodimerization . . ." J. Org. Chem. 1971, pp. 102–8.

SAMUEL H. BLECH, Primary Examiner

R. B. TURER, Assistant Examiner

U.S. Cl. X.R.

96—115 P; 204—159.24; 260—30.8 DS, 33.8 UA, 47 UA, 78.4 A, 343.2 R